(12) United States Patent
Lee (10) Patent No.: US 6,419,388 B2
(45) Date of Patent: Jul. 16, 2002

(54) MEDICAL THERMOMETER

(75) Inventor: Yung Ku Lee, Taipei Hsien (TW)

(73) Assignee: Microlife Intellectual Property GmbH, Berneck (CH)

( * ) Notice: Subject to any disclaimer, the term of this patent is extended or adjusted under 35 U.S.C. 154(b) by 0 days.

(21) Appl. No.: 09/938,635

(22) Filed: Aug. 27, 2001

Related U.S. Application Data (63) Continuation of application No. 09/414,552, filed on Oct. 8, 1999.
(60) Provisional application No. 60/103,568, filed on Oct. 9, 1998.

(51) Int. Cl.[7] ................................................. G01K 1/00
(52) U.S. Cl. ........................................ 374/208; 374/185
(58) Field of Search ................................ 374/185, 208; 600/549

(56) References Cited

U.S. PATENT DOCUMENTS

| | | | |
|---|---|---|---|
| 3,721,001 A | | 3/1973 | Crosby et al. |
| 4,036,211 A | | 7/1977 | Veth et al. |
| 4,183,248 A | | 1/1980 | West |
| 4,411,535 A | | 10/1983 | Schwarzschild |
| 4,487,208 A | | 12/1984 | Kamens |
| 4,729,672 A | * | 3/1988 | Takagi ........................ 206/306 |
| 4,743,121 A | * | 5/1988 | Takagi et al. ................ 264/250 |
| 5,013,161 A | | 5/1991 | Zaragoza et al. |
| 5,165,798 A | | 11/1992 | Watanabe |
| 5,178,467 A | | 1/1993 | Chen |
| 5,509,422 A | | 4/1996 | Fukami |
| 5,575,563 A | * | 11/1996 | Chiu et al. .................... 371/141 |
| 5,632,555 A | | 5/1997 | Gregory et al. |
| 6,068,399 A | | 5/2000 | Tseng |

FOREIGN PATENT DOCUMENTS

| | | | | |
|---|---|---|---|---|
| JP | 62-115641 | | 7/1987 | |
| JP | 62-184442 | | 11/1987 | |
| JP | 01-312432 | | 12/1989 | |
| JP | 02216021 A | * | 8/1990 | ............ G01K/7/00 |
| JP | 07027626 A | * | 1/1995 | ............ G01K/7/00 |
| JP | 2001242016 A | * | 9/2001 | ............ G01K/7/00 |

* cited by examiner

*Primary Examiner*—Diego Gutierrez
*Assistant Examiner*—Lydia M. DeJesús
(74) *Attorney, Agent, or Firm*—Shoemaker and Mattare (57) ABSTRACT

A medical thermometer for measuring the temperature of a patient comprises a metal tip (2) with an outer contact surface (3) for contacting the tissue of a patient. A temperature sensor (4) mounted within the metal tip (2) is used to produce a signal which represents the temperature of the metal tip (2). The temperature is displayed on a display (5). The metal tip surrounds a substantially hollow cavity (8) and is of a length (L) which is at least three times, preferably five times larger than the diameter of the metal tip (2). The metal tip (2) is free from additional heating means.

14 Claims, 8 Drawing Sheets

FIG. 1

(PRIOR ART)

FIG.2

(PRIOR ART)

(PRIOR ART)

(PRIOR ART)

MEDICAL THERMOMETER

This is a continuation of application Ser. No. 09/414552 filed Oct. 8, 1999 and claims benefit of provisional application 60/103,568 filed Oct. 9, 1998.

The invention relates to a quick response compact electronic medical thermometer according to the preamble of the independent patent claim 1.

It is known to use electronic thermometers for indicating the temperature of a patient for medical purposes. These compact electronic thermometers in the healthcare field generally take the form of a hand-held probe having an elongated shank portion therein. The elongated probe is especially configured for convenient oral, rectal or axillary use.

The probe is usually formed of a tube having a metal tip, within which the temperature-sensitive element is attached.

Since about 1985 the compact electronic medical thermometers brought some advantage due to easy readable display and quicker measurement time of about 60 to 90 seconds, compared to 3 to 5 minutes of traditional mercury thermometers. This measurement time delay is caused by the heat capacity of the probe and the fact that applying the entire probe to the patients tissue draws down the temperature of the tissue in the immediate region of the probe.

There have been several approaches to shorten the measurement time of compact electronic medical thermometers during the last 10 to 15 years.

E.g. U.S. Pat. No. 4,183,248 discloses an electronic thermometer probe which comprises two temperature sensors and a heater coil. The heater coil is used to thermally isolate the tip from the remainder of the probe, which eliminates long thermal time delays. They claim to reach a remarkable improvement of about 16 seconds measurement time.

U.S. Pat. No. 5,632,555 also discloses a medical thermometer which comprises a heater and a powerful and expensive microprocessor to adapt a prediction algorithm. The heater is used to bring the probe metal tip to a specific temperature when the probe is removed from a base housing. The predictive algorithm is to determine the final temperature before this temperature is effectively measured by the temperature sensor. They claim a measurement time of about 4 to 15 seconds.

All these known thermometers have certain drawbacks. Especially, thermometers having a built-in heater and/or expensive microprocessor with sophisticated circuitry are not suitable for home use, as these additional elements (heater, control means for the heater with high energy consumption, expensive microprocessor) lead to more expensive and bulky devices.

It is an object of the present invention to overcome the disadvantages of the prior art, especially to provide a quick response compact electronic medical thermometer for home use, which can be manufactured in an easy and economic way and which allows a faster measurement of the temperature of the patient, compared to conventional compact electronic medical thermometers.

According to the present invention, these objects are resolved with a quick response compact electronic medical thermometer according to the characterizing portion of independent patent claim 1.

The quick response compact electronic medical thermometer for measuring the temperature of a patient comprises a probe body which has a metal tip to contact with a patient's tissue. A temperature sensor is mounted within the metal tip.

The temperature sensor is adapted to produce a signal representing the temperature of the metal tip. The probe body with the metal tip is especially intended for oral, rectal or axillary use. Any kind of known temperature sensors could be used, e.g. temperature sensitive resistors (thermistors).

The quick response compact electronic medical thermometer further comprises a display for indicating the temperature of the metal tip. Upon contact between the patient's tissue and the metal tip, the displayed temperature of the metal tip approaches the patient's temperature.

The inventors of the present invention have surprisingly found that the execution of a probe body with metal tip without additional heating and with a ratio between the length of the metal tip and the diameter of the metal tip of at least three, preferably five, leads to a considerable reduction of the measurement time. According to the present invention, the metal tip surrounds a substantially hollow cavity filled with air or a gas or a material having a comparable thermal capacity.

This means that the cavity is not filled with a glue for fixing the temperature sensor within the metal tip. As the metal tip is relatively long, i.e. at least three times, preferably five times longer than the diameter of the metal tip, there is a large contact surface between the metal tip and the tissue of the patient.

The probe body has a tubular plastic part and an elongated metal tip. The metal tip comprises a substantially tubular portion and a closed end. The temperature sensor is mounted at the closed end. Thereby, the temperature sensor is separated from the probe body by the cylindrical portion of the metal tip. The cylindrical portion is heated by contact with the patient's tissue. A temperature gradient thereby is avoided or reduced. The whole metal tip is in contact with the tissue of the patient and is thereby also heated. As the heat capacity of the human body is extremely large compared to the heat capacity of the metal tip, the metal tip is heated without substantially cooling the patient's tissue. The heating means of the patent U.S. Pat. No. 4,183,248 are replaced according to the present invention by the tubular portion of the elongated metal tip, which is heated by direct contact with the tissue of the patient. The tubular portion of the elongated metal tip forms a thermal isolation between the closed end of the metal tip with the temperature sensor and the remainder of the probe body, which avoids thermal energy collected by the tip being conducted towards the housing of the thermometer.

The temperature sensor is preferably made substantially flat, is positioned inside the metal tip of the probe body and preferably has a thermal time constant of less than 4 sec in still/not moving air. Thermal time constant is defined as the period of time when the temperature of the sensor reaches 63.2% of the temperature difference.

The metal tip of the probe body preferably has a length of at least 10 millimeters (mm), preferably about 12 to 15 mm, and a diameter of about 3 to 4 mm. The probe body should be formed as long as possible. It should, however, be ensured that the entire contact surface of the metal tip remains in contact with the human tissue.

The metal tip preferably has a thickness of less than about 0.12 mm.

The temperature sensor is arranged at the top of the metal tip and is preferably fixed thereto by a drop of glue, preferably an epoxy resin with good thermoconductivity. The remainder of the cavity formed by the metal tip is free from glue, i.e. only filled with air or a gas or another material having a low thermal capacity. The closed end of the tip forming its top comprises a substantially flat portion and a substantially cylindrical portion.

The metal tip is usually made of a metal, for instance stainless steel. The metal tip could, however, be formed of any other suitable material with sufficient thermal conductivity.

The thermometer comprises usually switch means for turning on/off and display means for indicating the temperature. The switch can be manual or automatic (e.g. in combination with a box or a movement sensor) and the display can be integrated in the housing of the thermometer or can be arranged at a remote location.

The invention will be more clearly understood from the following description in conjunction with the accompanying drawings which show.

Figure 1:
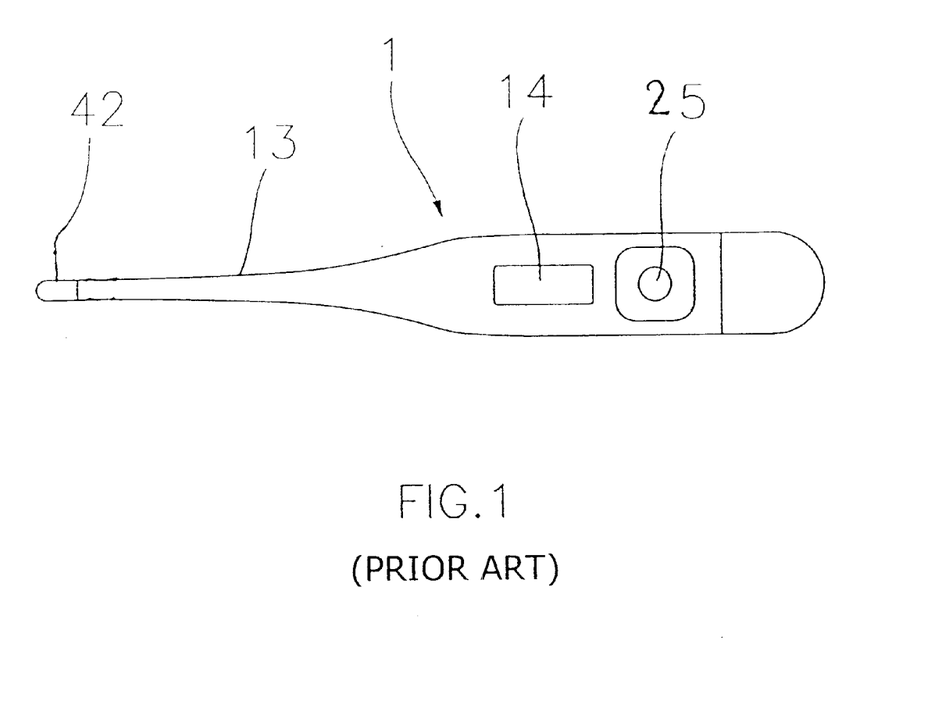
FIG. 1 a schematic representation of a conventional compact electronic medical thermometer FIG. 2 a schematic representation of the probe body near the metal tip of a conventional compact electronic medical thermometer FIG. 3 a schematic representation of the flow of heat in the embodiment according to FIG. 2, FIG. 4 a representation of a thermometer as disclosed in U.S. Pat. No. 4,183,248

FIG. 1 discloses a standard embodiment of a conventional compact electronic medical thermometer 1. The thermometer comprises a probe body 13 with a metal tip 42 within which a thermistor is fixed. The thermometer include a display 14 and a switch button 25.

Figure 2:
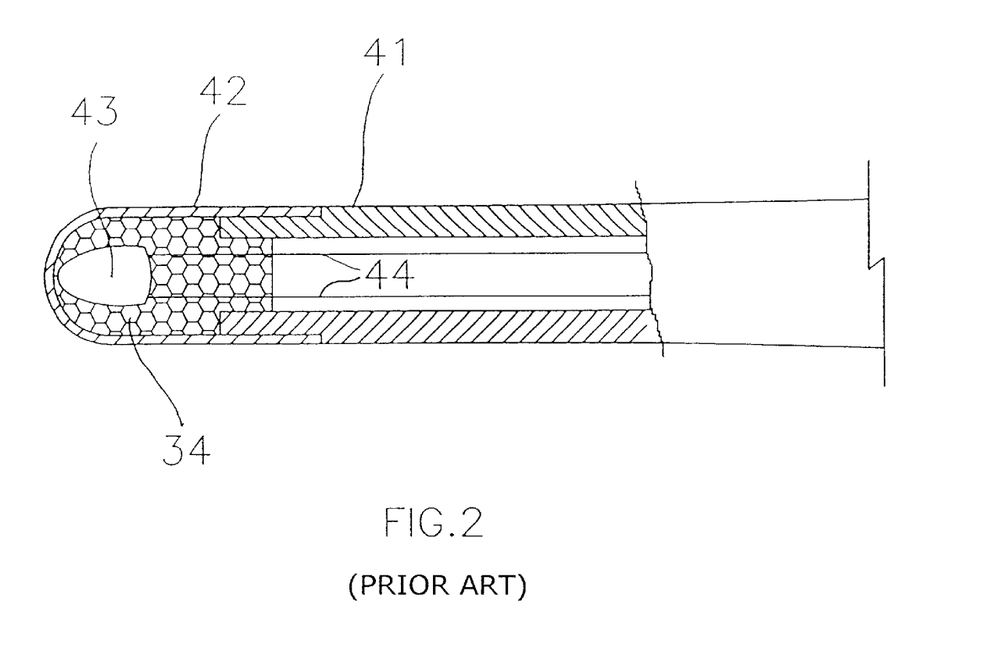

FIG. 2 discloses the enlarged portion of the probe body 41 near the metal tip 42, within which a bead-shaped thermistor 43 is fixed by a glue 34 and connected to wires 44.

Figure 3:
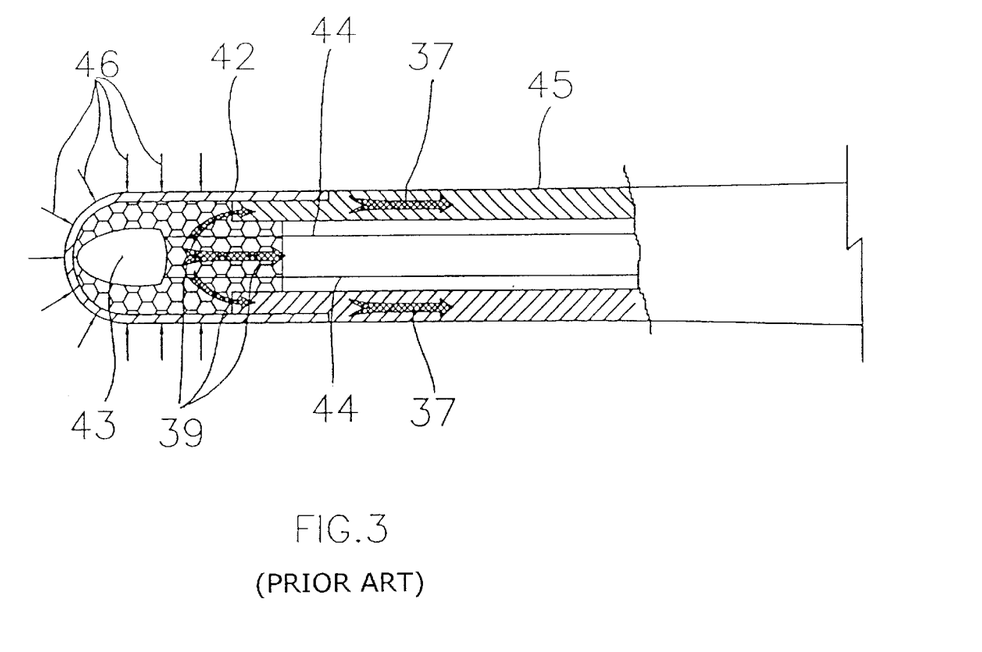

FIG. 3 shows the heat flow of such an embodiment. Heat from the patient=s tissue flows inwardly through the tip 42 as represented by arrows 46 and then to the sensor 43. At the same time heat flows from the metal tip 42 through the shank 45 as represented by arrows 37 and through the glue 34 to the shank 45 as represented by arrows 39. There is also some heat flow through the wire 44. It will again be appreciated that heat will flow through all three paths until an equilibrium temperature is reached. Due to the volume and mass of the parts involved, this equilibrium will only be reached after a considerable amount of time (approx. 60 to 90 seconds).

Figure 4:
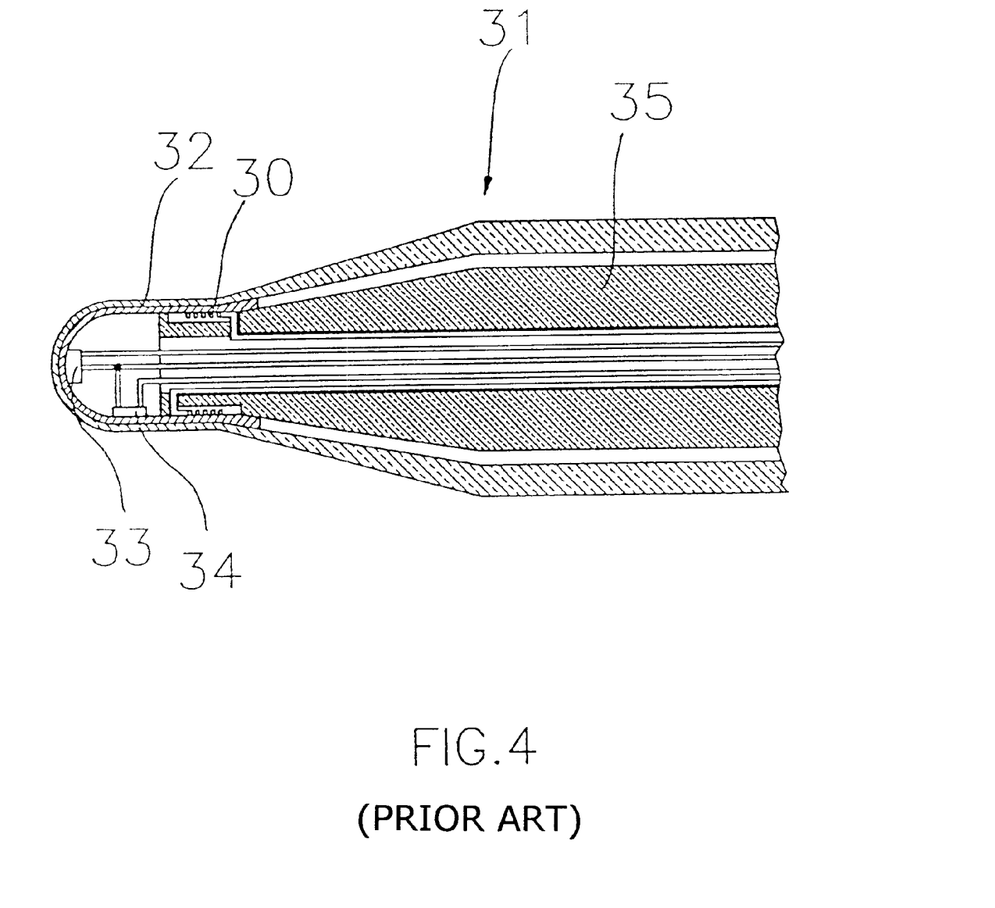

FIG. 4 discloses a thermometer 31 as it is disclosed in U.S. Pat. No. 4,183,248. The thermometer 31 is provided with a probe body with a metal tip 32. Inside the metal tip there is a first thermistor 33 for sensing the temperature of a patient=s tissue and with a second thermistor 34 for tracking the temperature of the side portion of the metal tip. The first temperature sensor 33 is secured to the inside of the front end of the tip and the tracking thermistor 34 is secured to the side portion of the tip. Electrical lead wires for the two sensors 33, 34 are connected to these sensors and pass through the hollow center of a probe shank 35. The leads are connected to a circuit for calculating and displaying the temperature of the patient=s tissue. This thermometer 31 also include a heater 30 which is located inside at the back end of the metal tip. This heater 30 is connected by lead wires to the temperature control circuitry.

Figure 5:
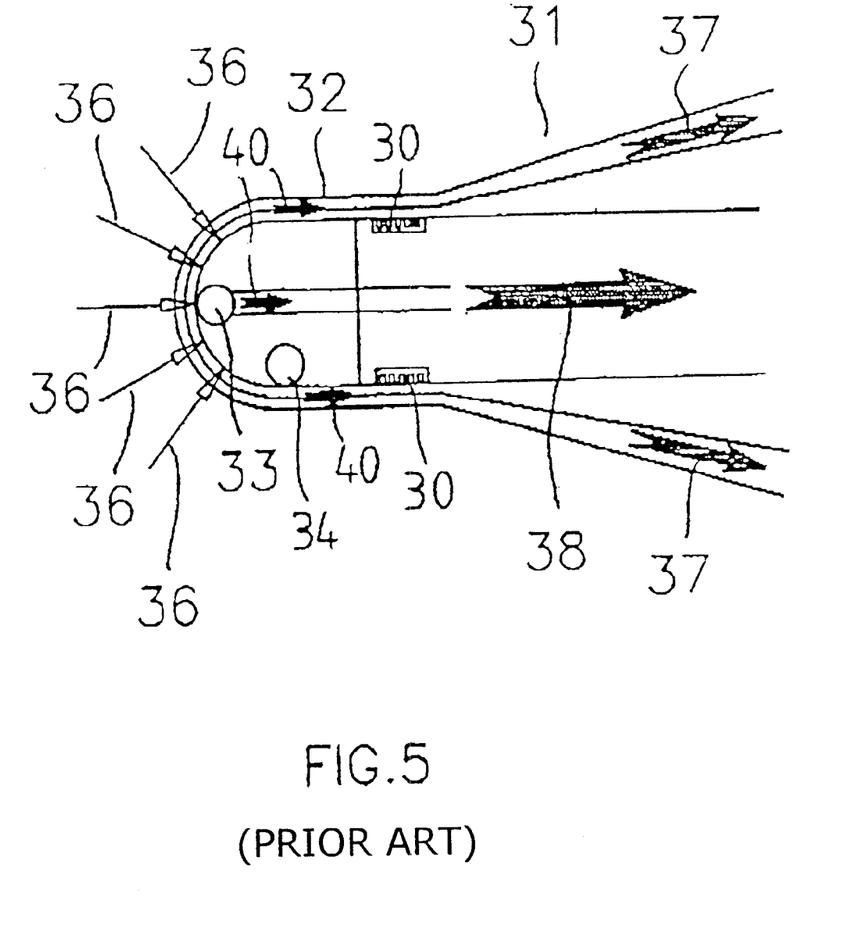
FIG. 5 a schematic representation of the flow of heat in an embodiment according to FIG. 4.

The flow of heat in a thermometer 31 according to FIG. 4 is shown in FIG. 5. Upon insertion of the probe body and into a body cavity of the patient, heat flows inwardly through the tip 32 of the probe and then to the sensor 33. This heat flow path is indicated by arrows 36. Heat further flows towards the heater 30, which flow is indicated by arrows 40.

This heat flow of course assumes that the body cavity of the patient is at a higher temperature than the probe, which is ordinarily the case prior to insertion. At the same time, heat is conducted from the tip area through to additional paths, which are indicated by arrows 37 and 38. It will be appreciated that the heat will flow through all three paths until an equilibrium temperature is reached, or approximated in the entire thermal mechanical system including and adjacent the tip region. With heat flowing through these paths 36, 37, 38, 40 a temperature gradation exists in the structure of FIG. 5, from the highest temperature at the flesh in contact with the tip area, to the lowest temperature along the shank 35 away from the tip area. As long as heat is flowing, the temperature gradation exists and the temperature of sensor 33 will be lower than the temperature of flesh in contact with the surface of the metal tip. In practice, if without the heater function, it may take up to three minutes for an equilibrium to be reached where the temperature of the shank portion near the tip becomes high enough to reduce the heat flow to the point that the temperature of sensor 33 is within 1/10 of a degree of the temperature of the tissue.

In thermometer 31 equipped with a heater 30 controlled by temperature difference between the thermistors 33 and 34, as long as there is temperature difference detected, the heater will be in function until that temperature difference approach to zero. Once there is no more temperature difference existing, that means the heat flow 40 has stopped. This embodiment functions as a thermal isolation between the metal tip and the remaining of the thermometer body 31. As a result, a measurement time of around 16 second can be reached in this prior art.

Figure 6:
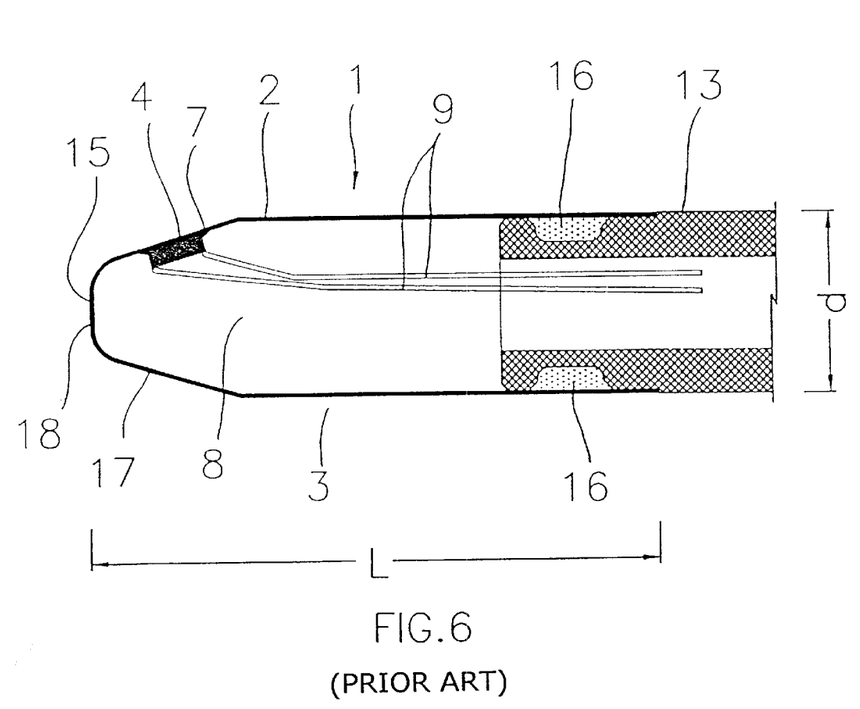
FIG. 6 a schematic representation of the probe body near the metal tip of the present invention.

FIG. 6 shows a thermometer 1 according to the present invention. The thermometer comprises a metal tip 2 and a plastic probe body 13 which is not shown in detail (see FIG. 8). The metal tip 2 is connected to the probe body 13, generally made of plastic material by a portion of glue 16.

The metal tip 2 is formed as a substantially tubular part made of thin metal. The metal tip is closed at the end 15. The end 15 comprises a substantially conical portion 17 which is closed by a flat or rounded end portion.

On the inner surface of the conical portion 17 is mounted a temperature sensor 4 by a point of glue 7, e.g. an epoxy resin with good thermal conductivity.

The remainder of the metal tip 2 is free from glue and preferably comprises air or a gas. Especially, on the flat or rounded portion 18 and on the conical and cylindrical portions 17 of the metal tip 2, there are no other thermal masses connected.

Wires 9 connect the temperature sensor 4 to a circuit for calculating and displaying the temperature which is measured by the temperature sensor 4.

The temperature sensor is a temperature dependent resistance, for instance a thermistor of the type SEMITEC, Type 503FT-3P.

The metal tip 2 comprises a contact surface 3 which is adapted to be brought into contact with the tissue of a patient and which surrounds a substantially hollow cavity 8. According to the present invention, the lengths L of the contact surface 3 is at least three times larger than the outer diameter d of the metal tip 2. Relevant for the flow of heat is the contact surface 3 which is to engage with the patient's tissue, i.e. the outer surface of the metal tip 2. In the specific embodiment of FIG. 6, the probe body has a length L of about 9–15 mm and an outer diameter d of about 3–5 mm.

The metal tip 2 is formed of stainless steel or any other material with good thermal conductivity and has a thickness of around 0.1–0.12 mm.

As the cavity 8 enclosed by the metal tip 2 is substantially hollow, with the exception of the point of glue 7 attaching the temperature sensor 4 to the inner side of the metal tip 2, the total of material which is relevant for the thermal capacity of the metal tip 2 is relatively small compared to the conventional electronic medical thermometer as described in FIG. 2.

Figure 7:
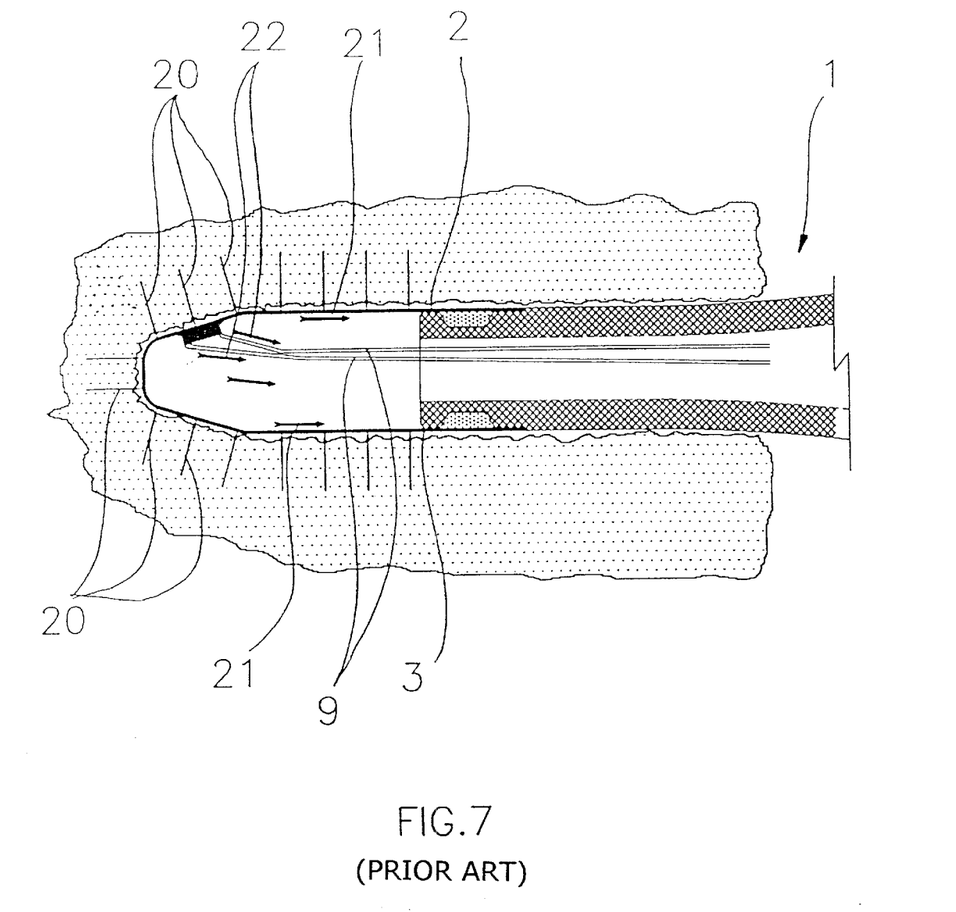
FIG. 7 a schematic representation of the flow of heat according to FIG. 6.

FIG. 7 shows the heat flow of the probe body near the metal tip 2 according to the present invention. Heat from the patient's tissue is transferred through the metal tip 2 as shown with arrows 20.

At the same time, heat is flowing through the relatively long metal tip 2 as indicated by arrows 21 and through the wires 9 as indicated by arrows 22. As the metal tip 2 is relatively long and is in contact with the patient's tissue over its entire length, the tissue surrounding the metal tip function like a distributing heater. So the temperature gradient over the metal tip can be neglected which leads to a very small heat flow 21. The elongate metal tip functions like a thermal isolation between the front part 15 of the metal tip and the remaining part of the probe body 13.

The wire 9 connecting the thermistor 4 to the electronic circuitry is very thin which means the heat flow 22 can also be neglected.

The embodiment of the present invention disclose a unique structure arrangement of the probe tip which provide a small thermal capacity and a function like thermal isolation between the probe tip and the remaining thermometer housing. This result in a significant reducing of the temperature measurement time from originally 60–90 seconds to 20–30 seconds with almost the same manufacturing cost compared to the conventional electronic medical thermometer.

Figure 8:
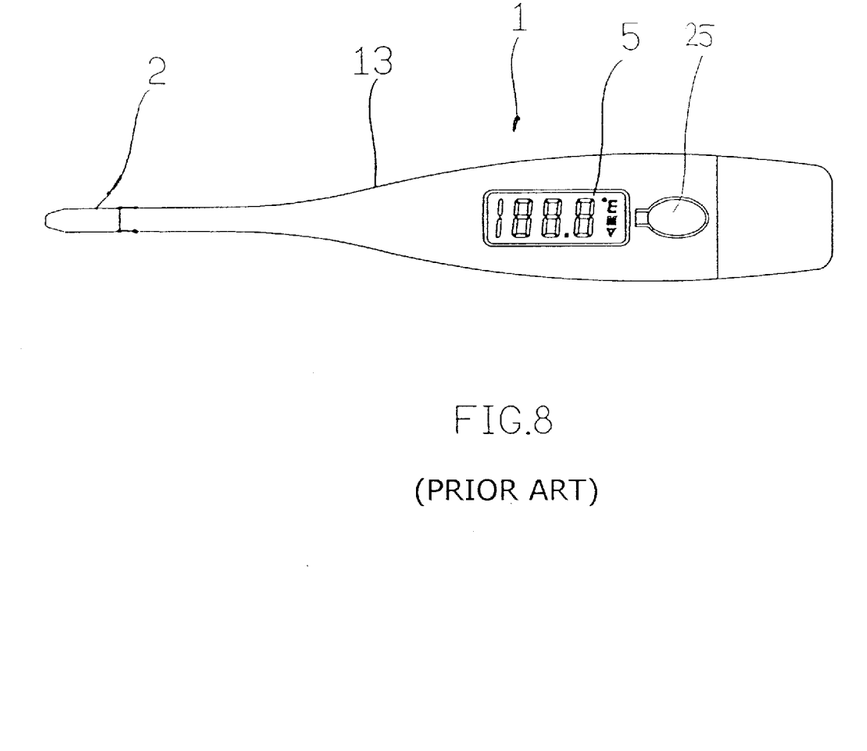
FIG. 8 a schematic representation of the present invention.

FIG. 8 shows a thermometer according to the present invention. Thermometer 1 comprises a metal tip 2, a probe body 13, a display 5 and a switch 25.

What is claimed is:

1. A quick response compact medical thermometer comprising
   a probe body,
   a hollow metal tip directly connected to said probe body, and
   said tip having a cylindrical portion and a substantially conical nose portion terminating at a rounded apex,
   a temperature sensor within the conical portion of the metal tip, for generating a signal representing the temperature of the metal tip, wherein:
   the ratio of the length of the tip to the diameter thereof is at least 3:1, and
   the thermometer is free from additional heating means for eliminating heat flow from the temperature sensor to the probe body.

2. A medical thermometer according to claim 1, wherein the temperature sensor has a thermal time constant of less than 4.0 seconds in still air.

3. A thermometer according to claim 1, wherein the metal tip has a length of at least 9 mm and a diameter of from 2 mm to 4 mm.

4. A medical thermometer according to claim 3, wherein the metal tip has a length in the range of 12–15 mm.

5. A thermometer according to claim 3, wherein the metal tip has a thickness of less than 0.15 mm.

6. A thermometer according to claim 1, wherein the temperature sensor is arranged at an inner side of the metal tip and is fixed to the closed end of the metal tip by a point of glue, the remainder of the cavity of the metal tip being free from glue.

7. A thermometer according to claim 1, wherein the metal tip is made of a stainless steel.

8. A thermometer according to claim 1, wherein the metal tip comprises an elongated tubular portion, a flat or rounded closed end, and a conical portion in which the temperature sensor is arranged.

9. A thermometer according to claim 1, wherein the probe body comprises a depression filled with a glue for fixing the metal tip to the probe body.

10. A thermometer according to claim 1, wherein the temperature sensor is connected to an electrical circuit by lead wires having a diameter less than about 0.5 mm.

11. A medical thermometer according to claim 10, wherein said lead wires have a diameter less than about 0.11 mm.

12. A medical thermometer according to claim 1, further comprising means for switching the thermometer on and off.

13. A medical thermometer according to claim 1, wherein said ratio is at least five.

14. A medical thermometer according to claim 1, further comprising display means for indicating temperature and means for switching the display means on and off.

* * * * *

UNITED STATES PATENT AND TRADEMARK OFFICE
CERTIFICATE OF CORRECTION

PATENT NO.   : 6,419,388 B2
DATED        : July 16, 2002
INVENTOR(S)  : Yunk Ku Lee It is certified that error appears in the above-identified patent and that said Letters Patent is hereby corrected as shown below:

Title page,
The title page should be deleted to appear as per attached title page.

Drawings,
The sheets of drawings consisting of figures 6-8 should be deleted to appear as per attached figures 6-8.

Signed and Sealed this

Seventeenth Day of December, 2002

JAMES E. ROGAN
*Director of the United States Patent and Trademark Office*

(12) United States Patent
Lee (10) Patent No.: US 6,419,388 B2
(45) Date of Patent: Jul. 16, 2002

(54) MEDICAL THERMOMETER

(75) Inventor: Yung Ku Lee, Taipei Hsien (TW)

(73) Assignee: Microlife Intellectual Property GmbH, Berneck (CH)

(*) Notice: Subject to any disclaimer, the term of this patent is extended or adjusted under 35 U.S.C. 154(b) by 0 days.

(21) Appl. No.: 09/938,635

(22) Filed: Aug. 27, 2001

Related U.S. Application Data (63) Continuation of application No. 09/414,552, filed on Oct. 8, 1999.
(60) Provisional application No. 60/103,568, filed on Oct. 9, 1998.

(51) Int. Cl.[7] .................................................. G01K 1/00
(52) U.S. Cl. ................................... 374/208; 374/185
(58) Field of Search .......................... 374/185, 208; 600/549

(56) References Cited

U.S. PATENT DOCUMENTS

| | | | |
|---|---|---|---|
| 3,721,001 A | 3/1973 | Crosby et al. | |
| 4,036,211 A | 7/1977 | Veth et al. | |
| 4,183,248 A | 1/1980 | West | |
| 4,411,535 A | 10/1983 | Schwarzschild | |
| 4,487,208 A | 12/1984 | Kamens | |
| 4,729,672 A * | 3/1988 | Takagi | 206/306 |
| 4,743,121 A * | 5/1988 | Takagi et al. | 264/250 |
| 5,013,161 A | 5/1991 | Zaragoza et al. | |
| 5,165,798 A | 11/1992 | Watanabe | |
| 5,178,467 A | 1/1993 | Chen | |
| 5,509,422 A | 4/1996 | Fukami | |
| 5,575,563 A * | 11/1996 | Chiu et al. | 371/141 |
| 5,632,555 A | 5/1997 | Gregory et al. | |
| 6,068,399 A | 5/2000 | Tseng | |

FOREIGN PATENT DOCUMENTS

| | | | |
|---|---|---|---|
| JP | 62-115641 | 7/1987 | |
| JP | 62-184442 | 11/1987 | |
| JP | 01-312432 | 12/1989 | |
| JP | 02216021 A * | 8/1990 | G01K/7/00 |
| JP | 07027626 A * | 1/1995 | G01K/7/00 |
| JP | 2001242016 A * | 9/2001 | G01K/7/00 |

* cited by examiner

Primary Examiner—Diego Gutierrez
Assistant Examiner—Lydia M. DeJesús
(74) Attorney, Agent, or Firm—Shoemaker and Mattare (57) ABSTRACT

A medical thermometer for measuring the temperature of a patient comprises a metal tip (2) with an outer contact surface (3) for contacting the tissue of a patient. A temperature sensor (4) mounted within the metal tip (2) is used to produce a signal which represents the temperature of the metal tip (2). The temperature is displayed on a display (5). The metal tip surrounds a substantially hollow cavity (8) and is of a length (L) which is at least three times, preferably five times larger than the diameter of the metal tip (2). The metal tip (2) is free from additional heating means.

14 Claims, 8 Drawing Sheets